UNITED STATES PATENT OFFICE.

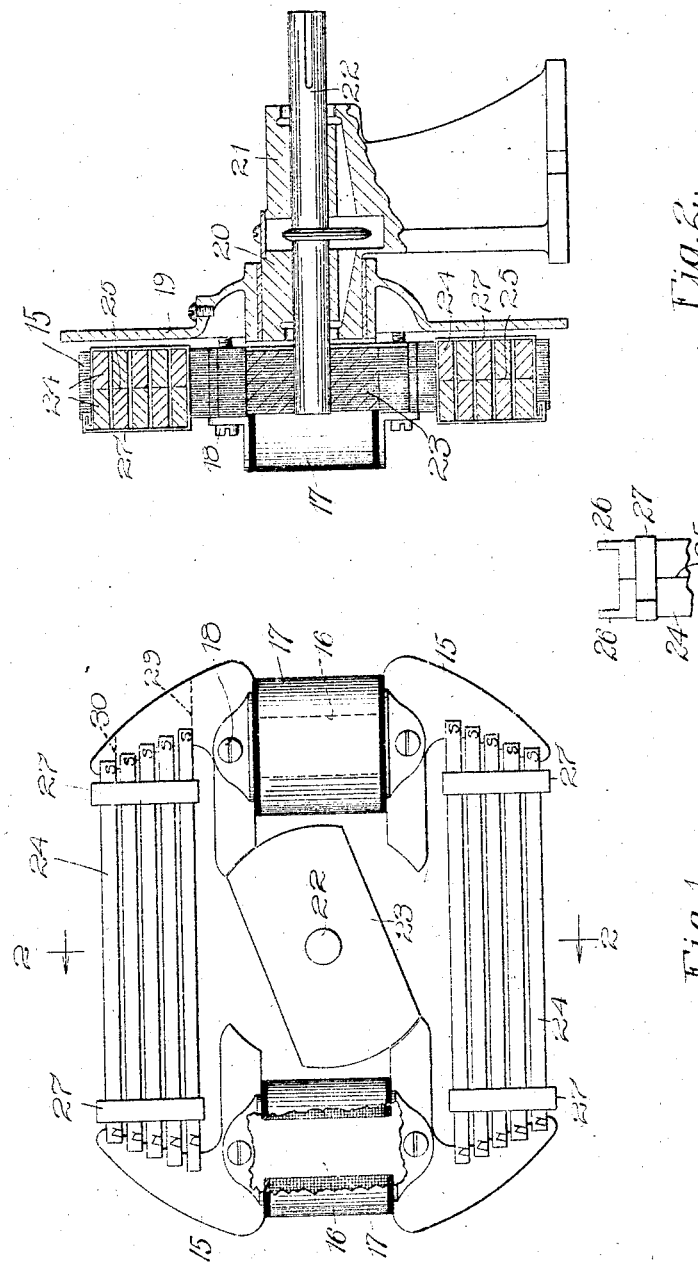

JOHN LEWIS MILTON, OF CHICAGO, ILLINOIS.

MAGNETO IGNITION APPARATUS.

1,096,853.  Specification of Letters Patent.  Patented May 19, 1914.

Application filed July 15, 1908. Serial No. 443,608.

*To all whom it may concern:*

Be it known that I, JOHN L. MILTON, a citizen of the United States, residing at Chicago, in the county of Cook and State of Illinois, have invented a certain new and useful Improvement in Magneto Ignition Apparatus, (Case No. 5,) of which the following is a full, clear, concise, and exact description, reference being had to the accompanying drawings, forming a part of this specification.

My invention relates to magneto ignition apparatus, and has for its object the provision of an inductor alternator of compact form, and one which at the same time is capable of producing very desirable effects. This compactness of design is secured by forming the laminated pole pieces so as to fit roughly within the confines of a circle.
Each set of permanent field magnets comprises a series of magnets of differing lengths, the shorter magnet of each set being placed at the outside and the longer magnets toward the center or axis of rotation. Notwithstanding this generally circular arrangement of the field magnet, I provide in the laminated pole pieces a large cross-sectional area through which the flux of all of the permanent magnets may pass.
The cross-sectional area is gradually diminished toward the outside until at the point traversed by the flux of but a single permanent magnet, this area is quite small and only sufficient for the purpose of conducting the flux from this single magnet. The result of this construction is that the magnetic efficiency is not sacrificed even though the design be well adapted for placement in confined locations and in positions such as frequently present themselves in automobile work, where, although the space is small, it is necessary to rotate the entire field magnet about the axis of rotation in order to adjust or time the position of the spark relatively to the annular position of the engine cranks. These various features of my invention will be more readily understood by reference to the accompanying drawings, in which—

Figure 1 is a view in front elevation of the magneto generator of my invention, certain parts being omitted and others broken away for the sake of clearness; Fig. 2 is a cross-sectional view taken on line 2—2 of Fig. 1, and Fig. 3 is a detailed view showing, in plan, the form of permanent magnets and indicating the manner of their connection to the pole pieces.

Referring to the drawings, it will be seen that my invention contemplates bifurcated pole pieces 15 having an outline substantially like that indicated in Fig. 1. These pole pieces are formed of laminated sheet-iron and are each provided with a pair of poles, each pair of poles being connected together by a yoke 16, around which a coil of wire 17 is wound. The screws 18 fasten the pole pieces firmly to the aluminum back plate 19 which is journaled upon the boss 20 of the bearing 21. The driving shaft 22 carries the rotor or inductor at one end, thus serving to rotate it between the poles of the field magnet. The permanent magnets are indicated at 24, each magnet being divided longitudinally at 25 and provided with projections 26 to prevent the lateral movement of the magnets relatively to the pole pieces when clamped together by means of the strips 27. It will be noted that the outer magnet of each set is the shortest, and that each successive magnet toward the center of the machine is of slightly greater length than the next one outside. The pole pieces are stepped to correspond with this difference in the length of the permanent magnets of each set. Notwithstanding the fact that the permanent magnets toward the center are longer than those at the outside, the still greater increase in the outside width of the pole pieces is such that the cross-sectional area on the dotted line 29 is greater than on the line with any other permanent magnet, thus providing for the greater flux which must traverse the pole pieces at this point. It will be noted that the cross-sectional area is least on the line 30, since the flux from the single permanent magnet on the outside of the machine is correspondingly less than at any other point nearer the center.

There is no winding upon the inductor or rotor member of the machine, the windings being confined to the yokes connecting the bifurcated pole pieces. It will be apparent to those skilled in the art that if the polarities of the permanent magnets be arranged as indicated in the drawings the magnetic flux will twice change its direction through each of the generator coils with each revolution of the rotor shaft. Each reversal of the direction of flux through the coils marks the peak of a wave of alternating current.

It will be understood by those skilled in the art that many modifications of the arrangements herein disclosed may be made without departing from the spirit of my invention, and I do not wish therefore to be limited to the precise details of these constructions. On the other hand, the scope of my invention is indicated in the accompanying claims.

In my copending application, Serial No. 357,041, filed February 12, 1907, I claim matter which is disclosed but not claimed in this application, viz., the general field structure, the general arrangement between the rotor and the field structure, the field magnets of different lengths, and the means for mounting these magnets. In my copending application, Serial No. 384,049, filed July 16, 1907, I also claim matter which is disclosed but not claimed in this application, viz., the arrangement of the field windings between the polar projections on the magnetic members.

I claim—

1. In a device of the class described, the combination of a rotor, two sets of permanent bar magnets, each set comprising magnets of different lengths, soft iron pole pieces surrounding the rotor and having a generally circular contour concentric with respect to the axis of the rotor, said pole pieces having stepped surfaces of engagement, and the sets of permanent magnets being located one on either side of the axis of rotation, the shortest magnet of each set being located farthest from the axis of rotation, and the other magnets of each set being arranged parallel with the shortest magnet and in the order of their length toward the axis of rotation, and means for holding the ends of the magnets in engagement with said stepped surfaces.

2. In a device of the class described, the combination of a rotor, two sets of permanent bar magnets, each set comprising magnets of different lengths, soft iron pole pieces surrounding the rotor and having a generally circular contour concentric with respect to the axis of the rotor, said pole pieces having stepped surfaces of engagement and the sets of permanent magnets being located one on either side of the axis of rotation, the shortest magnet of each set being located farthest from the axis of rotation and the other magnets of each set being arranged parallel with the shortest magnet and in the order of their length toward the axis of rotation, and means for holding the ends of the bar magnets in engagement with said stepped surfaces, the cross-sectional area of the pole pieces opposite the ends of the permanent magnets varying as the number of magnets whose flux is conveyed therethrough.

3. In a device of the class described, the combination of a rotor, two sets of longitudinally divided bar magnets with notched ends, the magnets of each set being of different lengths, soft iron pole pieces having stepped surfaces of engagement, said pole pieces surrounding the rotor and having a generally circular contour concentric with respect to the axis of rotation, means for holding the ends of the bar magnets in engagement with the stepped surfaces of the pole pieces, the shortest magnet of each set being located farthest from the axis of rotation, and the other magnets of each set being arranged parallel with the shortest magnet and in the order of their length toward the axis of rotation, the cross-sectional area of the pole pieces opposite the ends of the permanent magnets varying as the number of magnets whose flux is conveyed therethrough.

4. In an inductor-alternator, the combination, with a rotor, of a field-magnet structure comprising two sets of permanent straight-bar magnets, each set comprising magnets of different lengths, pole pieces arranged to connect poles of like polarity of said magnets and having a generally circular contour concentric with respect to the axis of the rotor, one set of magnets being located on either side of the axis of rotation, with the shortest magnet located farthest from the axis of rotation and the other magnets of each set arranged in the order of their length toward the axis of rotation.

In witness whereof, I hereunto subscribe my name this 8th day of July, 1908.

JOHN LEWIS MILTON.

Witnesses:
LYNN A. WILLIAMS,
LEONARD W. NOVANDER.